UNITED STATES PATENT OFFICE.

ROBERT E. WILSON, OF CAMBRIDGE, MASSACHUSETTS, ASSIGNOR TO PITTSBURGH PLATE GLASS COMPANY, OF PITTSBURGH, PENNSYLVANIA, A CORPORATION OF PENNSYLVANIA.

MANUFACTURE OF LEAD ARSENATE.

1,393,474.  Specification of Letters Patent.  Patented Oct. 11, 1921.

No Drawing.  Application filed March 1, 1919. Serial No. 280,164.

*To all whom it may concern:*

Be it known that I, ROBERT E. WILSON, a citizen of the United States, residing at Cambridge, in the county of Suffolk and State of Massachusetts, have invented certain new and useful Improvements in the Manufacture of Lead Arsenate, of which the following is a specification.

This invention relates to the manufacture of lead arsenate and has for its particular objects the production of a product which is capable of remaining in suspension in water for extraordinary periods without any noticeable or objectionable settling of the suspended particles.

My investigations have led to the discovery that the settling of insecticides consisting of either the acid arsenate of lead ($PbHAsO_4$) or the normal arsenate of lead $Pb_3(AsO_4)_2$ is due to the clustering or clumping of the particles, however fine the individual particles may be, and that such clusters often contain one hundred thousand or more separate particles. This phenomenon has been determined from calculations based on the rate of settling and qualitatively confirmed by observation under an unusually high-power microscope.

As a consequence of this tendency of the particles (apparently crystals) of lead arsenate to cluster, the rate of settling of many lead arsenate products on the market at the present time is enormously greater than would be the case were the clustering tendency of the individual particles overcome or at least substantially inhibited.

Heretofore attempts have been made to prevent the settling of the particles of lead arsenate by reducing the size of the particles, the same being accomplished either by fine grinding or by specially manipulating the precipitation of the lead arsenate in the course of manufacture thereof. This latter procedure it is claimed resulted in decreasing the settling tendency of a 250 cc. column of 1½" diameter of a specified quantity of lead arsenate during the first ten minute period by some 70 cc.

I have discovered that relatively minute quantities of materials capable of serving as protective colloids will, when dissolved in water and added to the bath in which the lead arsenate is precipitated either prior to or during the precipitation, or even following the precipitation, effect a de-clustering action with the consequence that the product when shaken up with water shows scarcely any tendency to settle in so far as leaving a clear layer at the upper end of mixture is concerned, even after one-half hour or more, whereas some of the best products heretofore obtained settled so as to leave a substantially clear layer above the settled particles at the rate of about one-half inch per minute.

The preferred protective colloid employed by me is ordinary glue in the proportion of 1/50% to 25/50%, as the same is not acted upon by the chemicals during the process of manufacture and accordingly it can be introduced prior to or during the precipitation stage with the consequence that a more complete and uniform mixture of the agent employed with the particles of lead arsenate whereby individual particles become coated with the agent before any appreciable clustering occurs.

While I prefer to employ ordinary glue, or if desired gelatin, other organic bodies of high molecular weight are also adapted to serve the purposes accomplished by the gelatin. Such bodies as tannin and pyrogallol may also be used, the same being preferably added after precipitation of the lead arsenate, and in fact any organic body which is capable of serving as a protective colloid and thus greatly inhibit the clustering of the lead arsenate particles when in water suspension, may be employed without departing from the spirit of my invention as embraced in the broad claims herein.

I have ascertained that alkalis, such as caustic alkalis, when employed in the proportion of about 1/10% in lieu of my organic agents, will inhibit the settling to a limited extent, about 25%, for example, and on the other hand that inorganic acids, as sulfuric acid when present in amounts of 1%, greatly increase the tendency of the lead arsenate to settle.

Wherever herein I have referred to percentage in connection with the de-clustering agent, the same is based on the weight of lead arsenate present in the mixture.

My improved product may be reduced to dryness and marketed as a dry powder. Its insecticidal power is unimpaired. It will keep almost indefinitely and will posses much greater covering properties than ordinary lead arsenate powders, with the consequence that it will be more effective and economical to use.

Organic compounds, such as glue or gelatin which are relatively chemically inert because of being neither acid nor basic are particularly desirable for the reason that they exert their protective action even in the presence of considerable amount of basic impurities often present in lead arsenate.

Having thus described my invention, what I claim and desire to secure by Letters Patent of the United States is:

1. The hereindescribed product comprising lead arsenate particles intimately associated with a relatively chemically inert colloid of organic origin.

2. The herein described product consisting of a water-insoluble insecticide material and incorporated therewith, a relatively small quantity of a relatively chemically inert organic substance capable of serving as a protective colloid for the particles of said insecticide.

3. The herein described product comprising acid lead arsenate and a small quantity of gelatin serving as a protective colloid coating for the particles of the lead arsenate, said product being adapted to remain suspended in water for upward of one-half hour without a substantially clear layer showing above the suspended particles.

4. A lead arsenate insecticide having the particles thereof coated with a relatively chemically inert organic protective colloid, the amount of said colloid totaling but a fraction of a per cent. by weight of the arsenate compound.

5. The process of treating a previously precipitated water insoluble insecticide with a solution or emulsion of a small quanity of a relatively chemically inert organic substance capable of serving as a protective colloid.

6. The process of treating a previously precipitated finely divided lead arsenate with a solution or emulsion of a small quantity of a relatively chemically inert organic substance capable of serving as a protective colloid.

7. The process of treating a previously precipitated water insoluble insecticide with a solution or emulsion of glue.

8. The process of treating a previously precipitated water insoluble insecticide with a solution or emulsion of gelatinous organic material.

ROBERT E. WILSON.

DISCLAIMER.

1,393,474.—*Robert E. Wilson*, Cambridge, Mass. MANUFACTURE OF LEAD ARSENATE. Patent dated October 11, 1921. Disclaimer filed May 24, 1923, by the assignee, *The Toledo Rex Spray Company*.

Hereby enters its disclaimer of any interpretation of the claims of said Patent No. 1,393,474 which includes such bodies as tannin and pyrogallol which are acid in character and which do not exert their protective action in the presence of considerable amounts of basic impurities and substances, such as litharge.

[*Official Gazette June 5, 1923.*]